(No Model.)
L. PETERSON.
HARVESTER REEL ATTACHMENT.
No. 422,152. Patented Feb. 25, 1890.
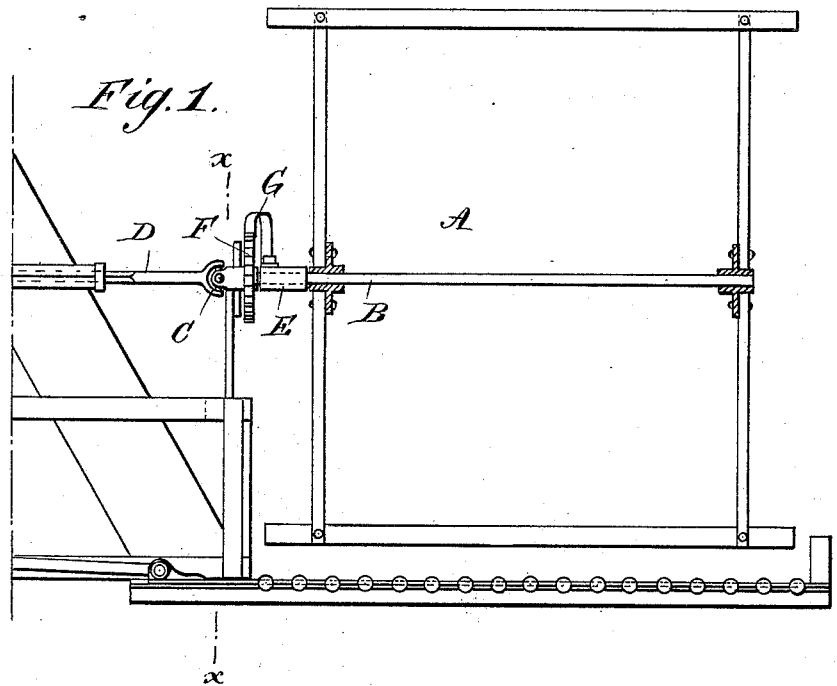
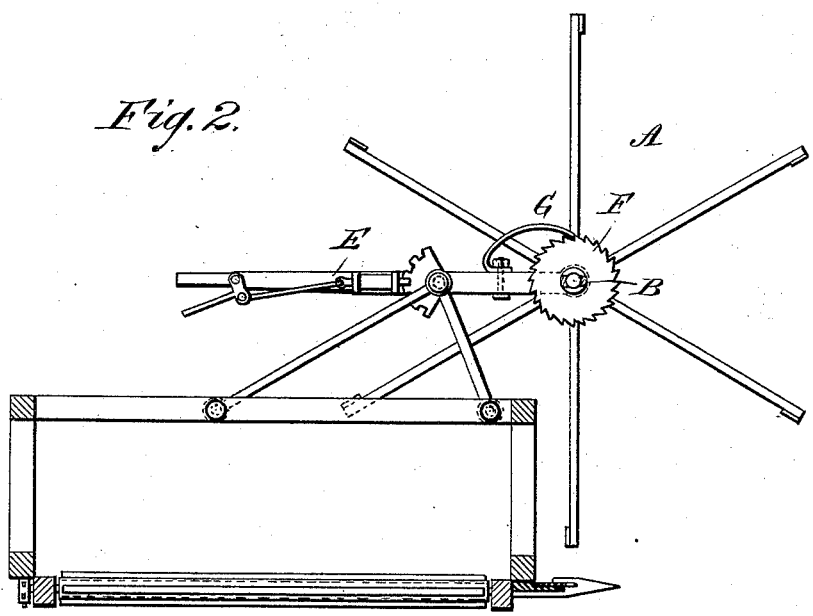
WITNESSES:
Donn Twitchell
Wm W Luyster
INVENTOR:
Ludvig Peterson
BY Munn & Co.
ATTORNEYS.

UNITED STATES PATENT OFFICE.

LUDVIG PETERSON, OF ARLINGTON, (DAKOTA TERRITORY,) SOUTH DAKOTA.

HARVESTER-REEL ATTACHMENT.

SPECIFICATION forming part of Letters Patent No. 422,152, dated February 25, 1890.

Application filed September 23, 1889. Serial No. 324,804. (No model.)

*To all whom it may concern:*

Be it known that I, LUDVIG PETERSON, of Arlington, in the county of Kingsbury and State of South Dakota, have invented a new and Improved Harvester-Reel Attachment, of which the following is a full, clear, and exact description.

The object of the invention is to provide a new and improved attachment for harvester-reels which is simple and durable in construction and prevents the reel from turning backward and throwing the grain into confusion on the platform or over the latter toward the cutting mechanism.

The invention consists of a ratchet-wheel secured on the shaft of the reel, a spring-pawl secured at one end to or near the lever for adjusting the reel, and at its free end engaging the teeth of the said ratchet-wheel.

The invention also consists of certain parts and details and combinations of the same, as will be hereinafter fully described, and then pointed out in the claim.

Reference is to be had to the accompanying drawings, forming a part of this specification, in which similar letters of reference indicate corresponding parts in both the figures.

Figure 1 is a front elevation of the improvement as applied, parts of the reel being in section; and Fig. 2 is a sectional side elevation of the same on the line $x\ x$ of Fig. 1.

The harvester-reel A, to which the improvement is applied, is of any approved construction and provided with the usual shaft B, connected by a universal joint C with the driving-shaft D, receiving a rotary motion from mechanism on the harvester.

The reel A is supported at its shaft B by the usual lever E, serving to raise and lower the reel as desired. On the shaft B, near the said lever E, is secured a ratchet-wheel F, the teeth of which are engaged by the free end of a spring-pawl G, secured at its other end to the lever E or to a bracket held on the harvester-frame near the said lever. The spring-pawl G always engages the teeth of the ratchet-wheel F, and thus prevents the latter from turning backward and at the same time presses with sufficient force on the ratchet-wheel to hold the reel A in such frictional contact in its bearing on the lever E as to prevent vibratory or rocking motion of the said reel.

The reels as ordinarily constructed have a certain amount of play on their axes, and rock thereon by gravity when the machine is stopped, in seeking equilibrium. This rocking throws the grain into confusion, and sometimes throws it in front of the cutting mechanism. The wind also causes the reel to turn back at times, as do large weeds, thereby bringing the lower reel slat or bar into contact with the grain. My attachment, it will be readily seen, prevents the reel from rotating toward the cutting mechanism, and the spring-pawl exerts a sufficient pressure to prevent accidental rotation in the opposite direction.

Having thus fully described my invention, I claim as new and desire to secure by Letters Patent—

A harvester-reel attachment comprising a ratchet-wheel secured on the shaft of the reel and a spring fastened at one end to or near the lever for adjusting the reel, and at its other free end engaging the teeth of the said ratchet-wheel, substantially as shown and described.

LUDVIG PETERSON.

Witnesses:
 OLE QUAM,
 A. ANDERSON.